(12) United States Patent
Moore

(10) Patent No.: US 10,948,326 B2
(45) Date of Patent: Mar. 16, 2021

(54) SOAP, SANITIZER AND LOTION DISPENSERS HAVING ADJUSTABLE VOLUME OUTPUTS

(71) Applicant: GOJO Industries, Inc., Akron, OH (US)

(72) Inventor: Mark W. Moore, Seven Hills, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 16/578,496

(22) Filed: Sep. 23, 2019

(65) Prior Publication Data

US 2020/0096375 A1    Mar. 26, 2020

Related U.S. Application Data

(60) Provisional application No. 62/735,276, filed on Sep. 24, 2018.

(51) Int. Cl.
*G01F 11/02* (2006.01)
*A47K 5/12* (2006.01)

(52) U.S. Cl.
CPC .......... *G01F 11/023* (2013.01); *A47K 5/1207* (2013.01); *A47K 5/1217* (2013.01)

(58) Field of Classification Search
CPC .... G01F 11/023; A47K 5/1217; A47K 5/1207
See application file for complete search history.

(56) References Cited

U.S. PATENT DOCUMENTS

| | | | |
|---|---|---|---|
| 8,955,718 B2 | 2/2015 | Ciavarella et al. | |
| 9,616,445 B2 | 4/2017 | Ciavarella et al. | |
| 10,034,585 B2 | 7/2018 | Moore et al. | |
| 2009/0045221 A1* | 2/2009 | Ophardt | A47K 5/1217 222/52 |
| 2009/0101679 A1* | 4/2009 | Muderlak | A47K 5/16 222/375 |
| 2009/0127282 A1* | 5/2009 | Reynolds | B41J 2/17506 222/23 |
| 2010/0051640 A1* | 3/2010 | Chen | A47K 5/1209 222/52 |
| 2015/0028062 A1* | 1/2015 | Carpenter | B65D 83/262 222/333 |

(Continued)

*Primary Examiner* — Vishal Pancholi
*Assistant Examiner* — Bob Zadeh
(74) *Attorney, Agent, or Firm* — Calfee, Halter & Griswold LLP

(57) ABSTRACT

A variable dose dispenser includes a housing, a sensor, a pump actuator, a drive mechanism and an adjustable drive member. The adjustable drive member is configured to connect to the drive mechanism in a first position and a second position. The adjustable drive member has a first surface with a first drive peg and a second surface with a second drive peg. The first drive peg is offset from a center of the adjustable drive member a first distance that is greater distance than the offset distance of the second drive peg. One of the first drive peg and the second drive peg engages the actuator and the other engage the drive mechanism. The adjustable drive member is secured to the pump actuator in a first position to dispense a first dose size and in a second position to dispense a second dose size.

24 Claims, 4 Drawing Sheets

(56) References Cited

U.S. PATENT DOCUMENTS

2015/0157176 A1* 6/2015 Muderlak ............ A47K 5/1217
                                                    222/333
2017/0112332 A1* 4/2017 Ciavarella ............... F04B 17/03
2020/0096375 A1* 3/2020 Moore ................. A47K 5/1207

* cited by examiner

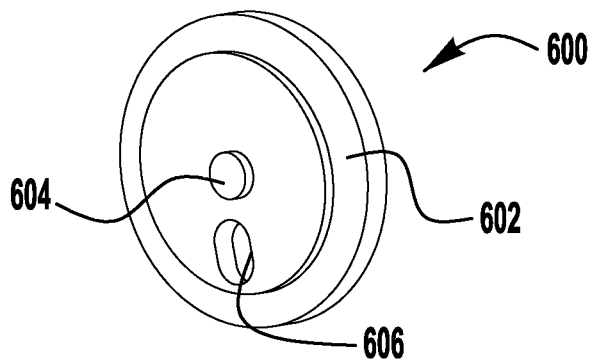
FIG. 6
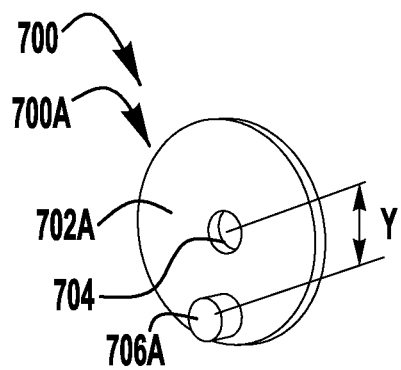   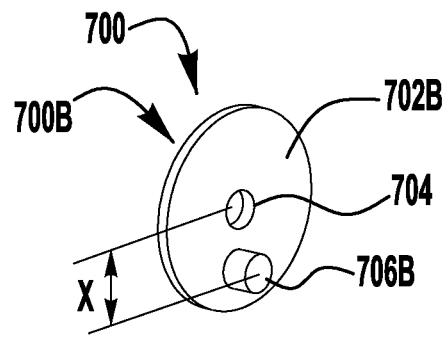
FIG. 7A           FIG. 7B
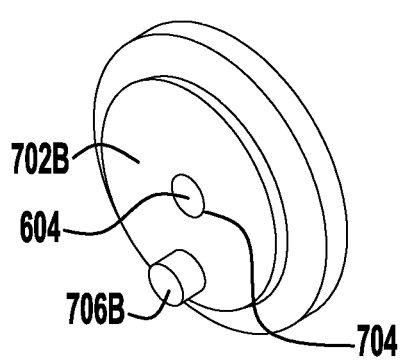   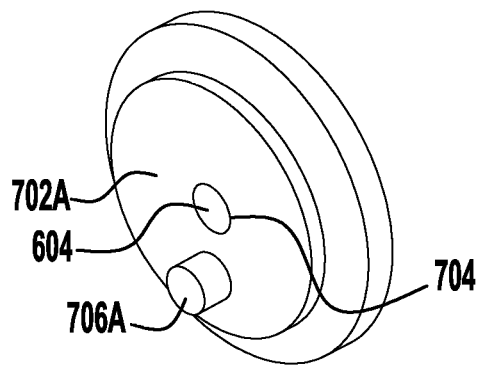
FIG. 8            FIG. 9

SOAP, SANITIZER AND LOTION DISPENSERS HAVING ADJUSTABLE VOLUME OUTPUTS

RELATED APPLICATIONS

This application claims priority to, and the benefits of, U.S. Provisional Patent Application No. 62/735,276, titled SOAP, SANITIZER AND LOTION DISPENSERS HAVING ADJUSTABLE VOLUME OUTPUTS, filed on Sep. 24, 2018, and which is incorporated herein by reference in its entirety.

BACKGROUND

Fluid dispensers are commonly used in restaurants, factories, hospitals, schools and bathrooms, and the like. These dispensers contain fluids such as, for example, soap, sanitizers, lotions, anti-bacterial cleansers, disinfectants, and the like. "Hands-free" dispensers may also be utilized wherein the user simply places their hand underneath or in front of a sensor and an electromechanical pump mechanism dispenses a metered quantity of fluid.

In some applications, dispensers are configured to receive a replaceable refill having a cartridge or container (e.g., a bag, pouch, bottle, etc.) that is removably installed at least partially within the dispenser housing or attached to the dispenser (e.g., below a countertop). The refill unit may include a pump and the cartridge or container may be connected to a pump, such as a, for example, a piston pump that has an outlet port for dispensing the contents of the cartridge or container. Piston pumps are relatively inexpensive.

However, piston pumps have a fixed volume and are designed to dispense a preset volume in each dose of fluid. It is not economical to have multiple styles of dispensers and/or pumps to accommodate multiple fluid dose volumes. To obtain a lower volume with the same pump/dispenser, prior art dispensers have been equipped with a stop bar that prevents the pump chambers from being fully compressed. For example, if the pump volume is designed for 1 ml of liquid to be dispensed with a travel of 1 inch, the stop bar is set at, for example, a travel of 0.5 inches to deliver 0.5 ml of liquid. This leads to inconsistent doses and often causes issues with priming of the pump.

U.S. Pat. No. 8,955,718, which is titled Foam Pumps With Lost Motion and Adjustable Output Foam Pumps, and U.S. Pat. No. 8,851,331 titled Fluid Dispensers with Adjustable Dosing, partially solved this problem with "lost motion" systems. These patents disclose systems in which the piston is pushed up all the way to empty the entire contents of the liquid pump chamber, but for smaller doses, the piston is not pulled all the way out, thereby only partially charging the system. Although this solution solves issues with pump priming and reduced dose sizes, due to the gap that causes the "lost motion", such systems may be noisy and may be subject to increased wear on the parts.

SUMMARY

The present application contemplates inventive systems and methods for controlling dispenser fluid outputs. Exemplary embodiments of touch-free variable dose dispenser are disclosed herein. An exemplary touch-free variable dose dispenser includes a housing, a sensor for detecting the presence of an object, a pump actuator, a drive mechanism and an adjustable drive member. The adjustable drive member is configured to releasably connect to the drive mechanism in a first position and a second position. The adjustable drive member has a first surface and a second surface. A first drive peg extends outward from the first surface. The first drive peg is offset from a center of the adjustable drive member a first distance. A second drive peg extending outward from the second surface. The second drive peg is offset from the center of the adjustable drive member a second distance. The first distance is greater than the second distance. One of the first drive peg and the second drive peg is configured to engage the pump actuator and the other of the first drive peg and the second drive peg is configured to engage the drive mechanism. The adjustable drive member is configured to be secured to the pump actuator in a first position to dispense a first dose size and in a second position to dispense a second dose size.

Another exemplary touch-free variable dose dispenser includes a housing, a sensor for detecting the presence of an object, a pump actuator, a drive mechanism, a first removable adjustable drive member and a second removable adjustable drive member. A first drive peg extends outward from a surface of the first removable adjustable drive member. The first drive peg offset from a center of the first removable adjustable drive member a first distance. A second drive peg extends outward from a surface of the second removable adjustable drive member. The second drive peg being offset from the center of the second adjustable drive member a second distance. The first distance is greater than the second distance. One of the first peg of the first removable adjustable drive member and the second peg of the second adjustable drive members is configured to connect to the pump actuator drive at a time, and the first removable adjustable drive members is configured to dispense a first dose size and the second removable adjustable drive member is configured to be secured to dispense a second dose size.

Another exemplary touch-free variable dose dispenser includes a housing, a sensor for detecting the presence of an object, a pump actuator that moves in a linear motion, a drive mechanism and an adjustable drive member. The adjustable drive member has a first surface and a second surface. A first drive peg extends outward from the first surface. The first drive peg offset from a center of the adjustable drive member a first distance. A second drive peg extends outward from the second surface. The second drive peg being offset from the center of the adjustable drive member a second distance. The first distance is greater than the second distance. The first and second drive pegs move in a circular motion and cause the pump actuator to move in a linear motion, and the adjustable drive member is configured to be secured to the pump actuator in a first position to dispense a first dose size and in a second position to dispense a second dose size.

BRIEF DESCRIPTION OF THE DRAWINGS

These and other features and advantages of the present invention will become better understood with regard to the following description and accompanying drawings in which:

FIG. 6 is a prospective view of a portion of the drive mechanism for an exemplary dispenser;

FIGS. 7A and 7B are prospective views of opposing sides of an adjustable drive member; and FIGS. 8 and 9 are prospective views of the adjustable drive member connected to the drive mechanism.

DETAILED DESCRIPTION

The Detailed Description merely describes exemplary embodiments of the invention and is not intended to limit the scope of the claims in any way. Indeed, the invention is broader than and unlimited by the exemplary embodiments, and the terms used in the claims have their full ordinary meaning. In addition, the exemplar mythologies/logic diagrams may include additional blocks or steps or may have some blocks or steps removed. Further, the blocks or steps may be performed in different orders.

Figure 1:
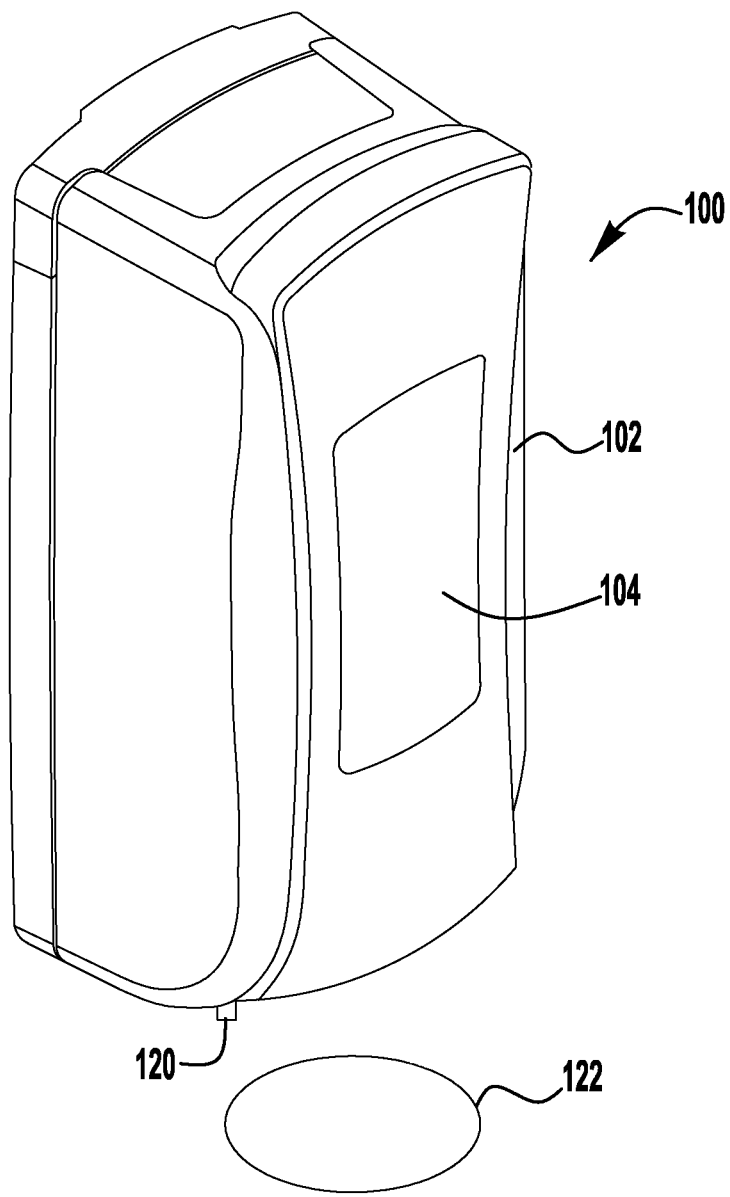
FIG. 1 is a prospective view of an exemplary dispenser.

FIG. 1 is a prospective view of an exemplary touch-free dispenser 100 that may be used with, or incorporate the inventive concepts disclosed herein. Dispenser 100 includes a front housing 102 connected to a backplate 104. Dispenser 100 includes a window 106 through which a container holding a fluid to be dispensed may be viewed. Other exemplary touch-fee dispensers that may be used are shown and described in U.S. Pat. No. 7,837,066 titled Electronically Keyed Dispensing System And Related Methods Utilizing Near Field Response; U.S. Pat. No. 9,172,266 title Power Systems For Touch Free Dispensers and Refill Units Containing a Power Source; U.S. Pat. No. 7,909,209 titled Apparatus for Hands-Free Dispensing of a Measured Quantity of Material; U.S. Pat. No. 7,611,030 titled Apparatus for Hans-Free Dispensing of a Measured Quantity of Material; U.S. Pat. No. 7,621,426 titled Electronically Keyed Dispensing Systems and Related Methods Utilizing Near Field Response; and U.S. Pat. No. 8,960,498 titled Touch-Free Dispenser with Single Cell Operation and Battery Banking; all which are incorporated herein by reference. The dispenser includes a sensor 120 for sensing an object 122.

Figure 2:
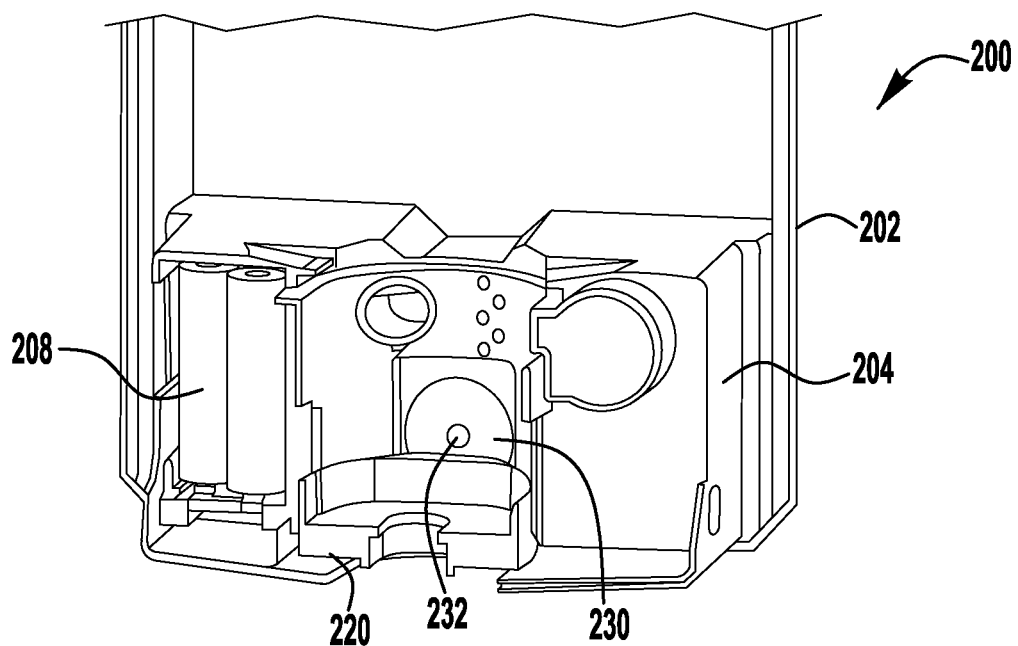
FIGS. 2 and 3 are partial prospective views of a portion of the pump housing and back plate of an exemplary dispenser.
Figure 3:
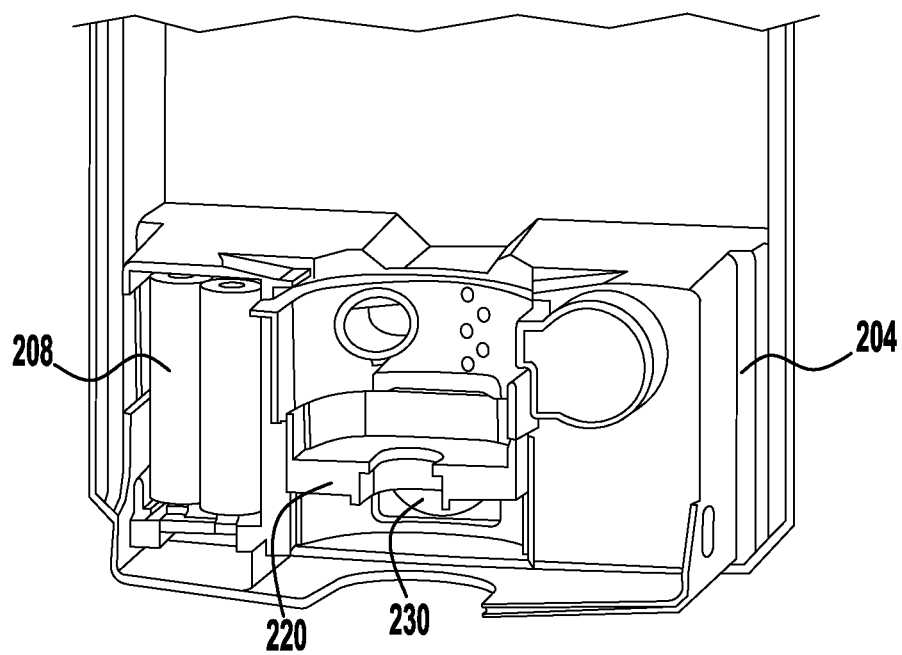
Figure 4:
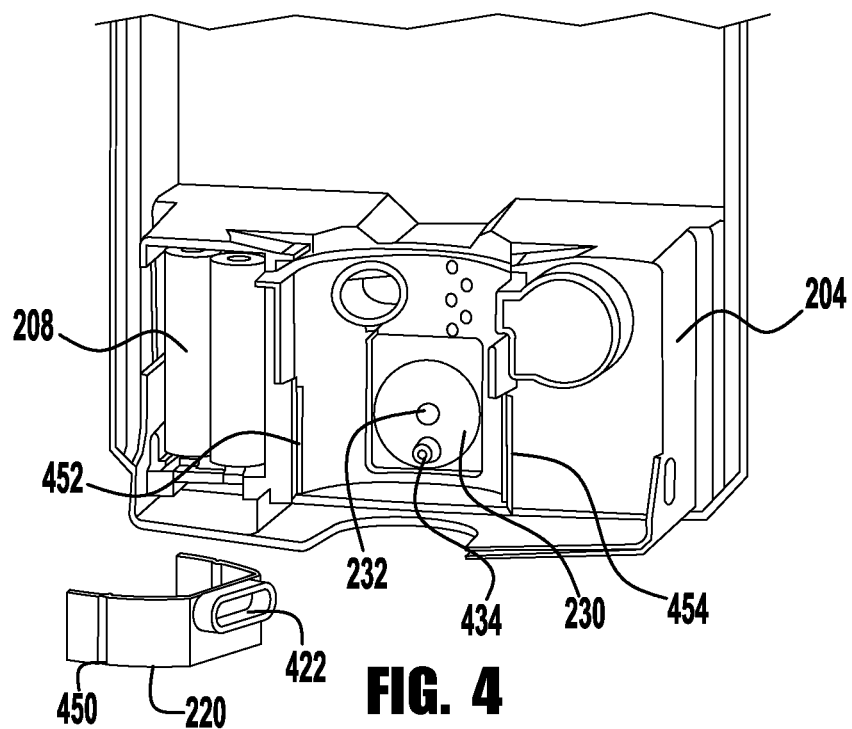
FIGS. 4 and 5 are partial prospective views of a portion of the pump housing and back plate of an exemplary dispenser with selected parts removed.
Figure 5:
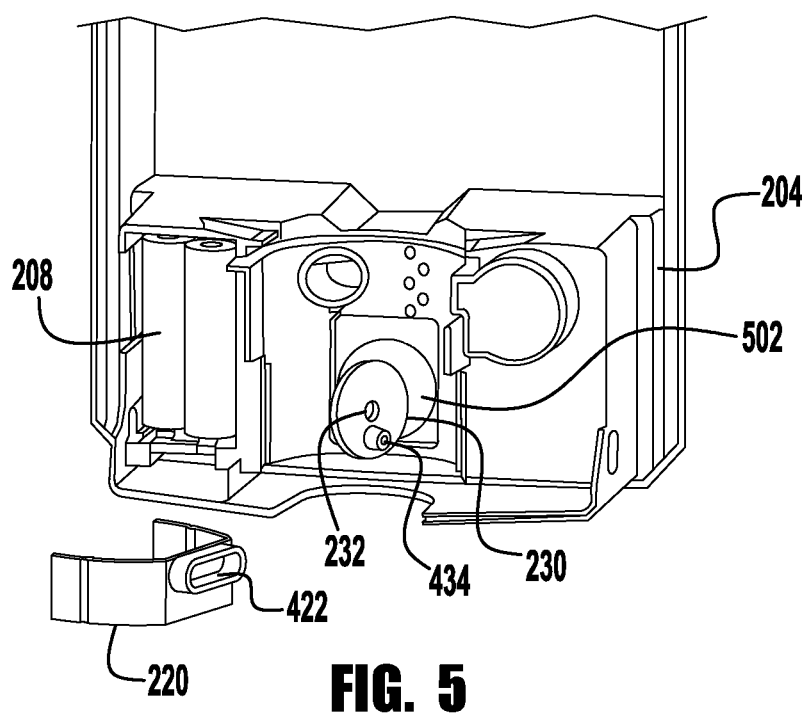

FIGS. 2 and 3 are partial prospective views of a portion of a pump housing 204 and back plate 202 of an exemplary dispenser 200. The exemplary pump housing 204 includes a power source 208, which in this case is a plurality of batteries. Located within the pump housing is circuitry (not shown) for controlling the operation of the dispenser, a sensor (not shown) for detecting an object, a motor (not shown) which moves a drive mechanism 600 (FIG. 6) that rotates adjustable drive member 230. Adjustable drive member 230 engages pump actuator 220, which moves upward and downward along guide rails 452, 454 (FIG. 4). In FIG. 2 pump actuator 220 is shown in a downward position and in FIG. 3 the pump actuator 220 is shown in an upward position.

FIG. 4 are partial prospective views of a portion of the pump housing 204 and back plate 202 of an exemplary dispenser 200. In FIG. 4, the pump actuator 220 has been removed from pump housing 204. In this exemplary embodiment, pump actuator 220 includes slots 450. Slots 450 engage guide rails 452 and 454 that allow pump actuator 220 to move up and down in a linear motion. Other types of coupling arrangements are contemplated that restrict movement of pump actuator 220 to upward and downward movement and also allow pump actuator 220 to be removed, or moved out of the way, to adjust adjustable drive member 230. In addition, in this exemplary embodiment, pump actuator 220 includes an slot 422. Slot 422 is engaged by drive peg 434 of adjustable drive member 230.

In this exemplary embodiment, adjustable drive member 230 has a circular shape and includes an aperture 232 through its center. Aperture 232 is configured to engage a projection in a drive mechanism 502 to hold adjustable drive member 230 in place. Rotation of drive mechanism 502 causes the adjustable drive member 230 to rotate. As discussed in more detail below, drive mechanism 502 includes a slot (not shown) for receiving a projection (described in more detail below) on the adjustable drive member 230. In some embodiments, drive mechanism 502 has a recess (not shown), such as, for example, a rectangular recess (not shown) and adjustable drive member is configured to fit at least partially within the recess (not shown). In some embodiments, aperture 232 is a projection and the drive mechanism 502 includes an aperture for receiving the projection. Aperture 232 has a circular shape. In some embodiments, aperture 232 has a different shape and matches the shape of the projection in drive mechanism 502. In some embodiments, the shape is configured to be used to drive the adjustable drive member 230, for example, in some embodiments, aperture 232 has a star shape, a gear shape, a rectangular shape, a polygonal shape, or the like.

Adjustable drive member 230 includes a first drive peg 434 on the front surface. In some embodiments, the adjustable drive member 230 includes a second drive peg (not shown) on the back side of the drive member. First drive peg 434 is offset from the center of the adjustable drive member 230 by a first distance. If equipped with a second drive peg (not shown), the second drive peg is offset from the center of the adjustable drive member 230 by a second distance that is different than the first distance. When the adjustable drive member 230 rotates, the uppermost and lower most position of the first drive peg 434 (which defines the length of the stroke of pump actuator 220) is a product of the distance the first drive peg 434 is offset from the center of the adjustable drive member 230.

The adjustable drive member 230 is removable from the drive mechanism (not shown) and in some embodiments may be turned around and placed in a reversed position wherein the second drive peg (not shown) would be configured to engage the pump actuator 220 and cause the pump actuator 220 to have a different stroke length because the second drive peg (not shown) is offset from the center of the adjustable drive member 230 at a distance different than the first drive peg 434.

FIG. 6 is a prospective view of an exemplary drive mechanism 600 for an exemplary dispenser (not shown) and associated drive components (not shown). Drive mechanism 600 is configured to connect to the associated drive components (not shown) and rotates to move a pump actuator (not shown) via an adjustable drive member 700. Drive mechanism 600 includes a central projection 604 and an elongated slot 606. Central projection 604 is circular in this exemplary embodiment, however, as described above central projection 604 may take the form of other shapes and may be used to ensure that the adjustable drive member 700 rotates along with the drive mechanism 600. In addition, exemplary drive mechanism 600 has a flat circular profile, however, drive mechanism 600 may have many different profiles, such as, for example, a rectangular shape, a cross-shape and the like. In some embodiments, the drive mechanism may have a recessed portion that is configured to receive at least a portion of the profile of an adjustable drive member. For example, the drive mechanism 600 may have a rectangular recess that receives an adjustable drive member with a rectangular profile. In this exemplary embodiment, elongated slot 606 is configured to receive drive pegs 706A, 706B. When adjustable drive member 700 is connected to drive mechanism 600, the drive peg inserted in elongated slot 606 which during operation causes the adjustable drive member 700 to rotate along with drive mechanism 600. In some embodiments, slot 606 is replaced with an aperture for receiving one drive peg, e.g. the first drive peg and a second aperture for receiving the other drive peg, e.g. the second drive peg. Thus, there may be two or more apertures or slots for receiving drive pegs located on the drive mechanism. In some embodiments, the profile of the adjustable drive member mates with the drive mechanism 600, such as, for example, fitting within a recess, and the mating of the adjustable drive member with the drive mechanism 600 to cause the adjustable drive member to rotate with the drive mechanism 600.

FIGS. 7A and 7B are prospective views of opposing sides of an exemplary adjustable drive member 700. FIG. 7A illustrates a first side 700A of the adjustable drive member 700. First side of adjustable drive member 700 includes a first drive peg 706A. First drive peg 706A is offset a distance Y from the center of the adjustable drive member 700. In this exemplary embodiment, first drive peg 706A is offset distance Y, which produces an 0.9 mL dose of fluid to be dispensed. FIG. 7B illustrates a second side 700B of the adjustable drive member 700. Second side 700B of adjustable drive member 700 includes a second drive peg 706B. Second drive peg 706B is offset a distance X from the center of the adjustable drive member 700. In this exemplary embodiment, first drive peg 706B is offset distance X, which produces an 0.7 mL dose of fluid to be dispensed. In addition, in this exemplary embodiment, drive peg 706A is configured to provide the maximum stroke length of the actuator (not shown). The maximum stroke length is configured to drive an associated piston pump (not shown) so that the associated piston pump operates at its maximum pump volume, i.e. the associated piston of the pump moves its full length of travel to completely empty or completely fill the liquid pump chamber. In this exemplary embodiment, drive peg 706B is configured to provide less than the maximum stroke length of the actuator. The less than maximum stroke length is configured to drive actuator so that the associated piston pump operates at less than the maximum pump volume. In this exemplary embodiment, the liquid piston of the piston pump does not completely empty or completely fill the liquid pump chamber. In other words, in a first configuration, the adjustable drive member 700 causes the actuator to travel its full length which causes the piston of the piston pump to travel its full length of travel within the liquid pump chamber and in a second configuration, adjustable drive member 700 causes the actuator to travel a reduced travel length which causes the piston to travel a reduced length of travel and the reduced length of travel occurs on each side of the liquid pump chamber. In some embodiments, in a first position, the adjustable drive member causes the actuator to travel its maximum stroke length, e.g. between a maximum upper position and a maximum lower position. In a second position, the adjustable drive member causes the actuator to travel a stroke length that is less than the maximum stroke length, e.g. between a position that is less than to the maximum upper position and a position that is less than the maximum lower position or between a position that is lower than the maximum upper position and a position that is higher than the maximum lower position. The term upper position and lower position are used for ease of understanding for an actuator that moves up and down. If the actuator moves horizontally, or in and out, the terms upper position and lower position may be used interchangeably with the terms inner position or outer position.

FIGS. 8 and 9 are prospective views of the adjustable drive member 700 connected to the drive mechanism 600. FIG. 8 illustrates the adjustable drive member 700 with first side 700A mounted outward provide a 0.9 mL output and FIG. 9 illustrates the adjustable drive member 700 with the second side 700B mounted outward provide a 0.7 mL output.

During operation when a user wants to change the configuration of the dispenser to dispense a selected dose, the user removes the pump actuator 220 and removes the adjustable drive member 700 and turns it around and reconnects it to the drive mechanism. The pump actuator 220 is reconnected to the dispenser so that the drive peg engages the pump actuator 220.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

I claim:

1. A touch-free variable dose dispenser comprising:
   a housing;
   a sensor for detecting the presence of an object;
   a pump actuator;
   a drive mechanism;
   an adjustable drive member configured to releasably connect to the drive mechanism in a first position and a second position;

the adjustable drive member having a first surface and a second surface;
a first drive peg extending outward from the first surface;
the first drive peg offset from a center of the adjustable drive member a first distance;
a second drive peg extending outward from the second surface;
the second drive peg being offset from the center of the adjustable drive member a second distance;
wherein the first distance is greater than the second distance;
wherein one of the first drive peg and the second drive peg is configured to engage the pump actuator and the other of the first drive peg and the second drive peg is configured to engage the drive mechanism; and
wherein the adjustable drive member is configured to be secured to the pump actuator in a first position to dispense a first dose size and in a second position to dispense a second dose size.

2. The touch-free variable dose dispenser of claim 1 wherein the adjustable drive member comprise a centrally located member for aligning the adjustable drive member with the drive mechanism.

3. The touch-free variable dose dispenser of claim 1 the first drive peg and the second drive peg have a cylindrical shape.

4. The touch-free variable dose dispenser of claim 1 wherein the drive mechanism comprises a centrally located member for aligning with the adjustable drive member.

5. The touch-free variable dose dispenser of claim 1 wherein the drive mechanism comprises a slot for receiving one of the first and second drive pegs.

6. The touch-free variable dose dispenser of claim 1 wherein the first and second drive pegs have a cylindrical shape.

7. The touch-free variable dose dispenser of claim 1 wherein the drive mechanism comprises a first aperture for receiving the first drive peg and second aperture for receiving the second drive peg.

8. A touch-free variable dose dispenser comprising:
a housing;
a sensor for detecting the presence of an object;
a pump actuator;
a drive mechanism;
a removable adjustable drive member;
a first drive peg extending outward from a first surface of the removable adjustable drive member;
the first drive peg offset from a center of the first removable adjustable drive member a first distance;
a second drive peg extending outward from a second surface of the removable adjustable drive member;
the second drive peg being offset from the center of the adjustable drive member a second distance;
wherein the first distance is greater than the second distance;
wherein in a first position the removable adjustable drive member is configured to move the pump actuator a full travel length between an upper position and a lower position and wherein in a second position the removable adjustable drive member is configured to move the pump actuator a reduced travel length between a position that is lower than the upper position and a position that is higher than the lower position.

9. The touch-free variable dose dispenser of claim 8 wherein the removable adjustable drive member comprise a centrally located member for aligning the adjustable drive member with the drive mechanism.

10. The touch-free variable dose dispenser of claim 8 the first drive peg and the second drive peg have a cylindrical shape.

11. The touch-free variable dose dispenser of claim 8 wherein the drive mechanism comprises a centrally located member for aligning with the one of the first and second removable adjustable drive members.

12. The touch-free variable dose dispenser of claim 8 wherein the drive mechanism comprises a slot for receiving one of the first and second drive pegs.

13. A touch-free variable dose dispenser comprising:
a housing;
a sensor for detecting the presence of an object;
a pump actuator;
wherein the pump actuator moves in a linear motion;
a drive mechanism;
an adjustable drive member;
the adjustable drive member having a first surface and a second surface;
a first drive peg extending outward from the first surface;
the first drive peg offset from a center of the adjustable drive member a first distance;
a second drive peg extending outward from the second surface;
the second drive peg being offset from the center of the adjustable drive member a second distance;
wherein the first distance is greater than the second distance;
wherein the first and second drive pegs move in a circular motion and cause the pump actuator to move in a linear motion; and
wherein the adjustable drive member is configured to be secured to the pump actuator in a first position to dispense a first dose size and in a second position to dispense a second dose size.

14. The touch-free variable dose dispenser of claim 13 wherein the adjustable drive member comprises a centrally located member the centrally located member is an aperture.

15. The touch-free variable dose dispenser of claim 13 the first drive peg and the second drive peg have a cylindrical shape.

16. The touch-free variable dose dispenser of claim 13 wherein the drive mechanism comprises a centrally located member for aligning with the removable adjustable drive members.

17. The touch-free variable dose dispenser of claim 13 wherein the drive mechanism comprises a slot for receiving one of the first and second drive pegs.

18. The touch-free variable dose dispenser of claim 13 wherein the drive mechanism comprises a first aperture for receiving the first drive peg and second aperture for receiving the second drive peg.

19. The touch free variable dose dispenser of claim 13 wherein the removable adjustable drive member is a unitary piece with the first drive peg located on a first surface and the second drive peg located on an opposite surface.

20. A touch-free variable dose dispenser comprising:
a housing;
a sensor for detecting the presence of an object;
a pump actuator;
a rotating drive;
an adjustable drive member;
the adjustable drive member releasably connects to the rotating drive in a first position and a second position;

the adjustable drive member having a first surface and a second surface;

a first drive peg extending outward from the first surface;

the first drive peg offset from a center of the adjustable drive member a first distance;

a second drive peg extending outward from the second surface;

the second drive peg being offset from the center of the adjustable drive member a second distance;

wherein the first distance is greater than the second distance;

wherein one of the first drive peg and the second drive peg is configured to engage the pump actuator and the other of the first drive peg and the second drive peg is configured to engage the drive mechanism; and wherein the adjustable drive member is configured to be secured to the pump actuator in a first position to dispense a first dose size and in a second position to dispense a second dose size.

21. The touch-free variable dose dispenser of claim 20 wherein the adjustable drive member comprise a centrally located member for aligning the adjustable drive member with the drive mechanism.

22. The touch-free variable dose dispenser of claim 20 wherein the rotating drive comprises a slot for receiving one of the first and second drive pegs.

23. The touch-free variable dose dispenser of claim 20 wherein the first and second drive pegs have a cylindrical shape.

24. The touch-free variable dose dispenser of claim 20 wherein the rotating drive comprises a first aperture for receiving the first drive peg and second aperture for receiving the second drive peg.

* * * * *